United States Patent [19]

Tsuchiya et al.

[11] Patent Number: 5,304,444
[45] Date of Patent: Apr. 19, 1994

[54] PHOTOSENSITIVE MATERIAL FOR ELECTROPHOTOGRAPHY COMPRISING ORGANIC PHOTOCONDUCTIVE SUBSTANCES IN A BINDER POLYMER HAVING AROMATIC RINGS, OH GROUPS AND BROMINE JOINED AT THE AROMATIC RING OR RINGS

[75] Inventors: Sohji Tsuchiya, Kanagawa; Atsushi Omote, Kawasaki; Yoshimasa Ito, Tokyo; Kenji Akami, Kawasaki; Mutsuaki Murakami, Tokyo, all of Japan

[73] Assignee: Matsushita Electric Industrial Co., Ltd., Osaka, Japan

[21] Appl. No.: 45,286

[22] Filed: Apr. 12, 1993

Related U.S. Application Data

[63] Continuation of Ser. No. 705,981, May 28, 1991, abandoned.

[30] Foreign Application Priority Data

| May 25, 1990 | [JP] | Japan | 2-135914 |
| May 25, 1990 | [JP] | Japan | 2-135915 |
| May 25, 1990 | [JP] | Japan | 2-135916 |
| Nov. 7, 1990 | [JP] | Japan | 2-303619 |
| Nov. 7, 1990 | [JP] | Japan | 2-303620 |
| Nov. 7, 1990 | [JP] | Japan | 2-303621 |

[51] Int. Cl.⁵ .................. G03G 5/05; G03G 5/06
[52] U.S. Cl. .................. 430/58; 430/56; 430/96
[58] Field of Search .................. 430/96, 59, 58, 56

[56] References Cited

U.S. PATENT DOCUMENTS

| 3,368,893 | 2/1968 | Garrett | 96/1 |
| 3,816,118 | 6/1974 | Byrne | 96/1.5 |
| 3,865,789 | 2/1975 | Wyhof | 260/47 |
| 3,865,869 | 2/1975 | Kuehn et al. | 260/47 C |
| 3,905,813 | 9/1975 | Wyhof | 96/1.5 |
| 3,923,509 | 12/1975 | Kuehn et al. | 96/1.8 |
| 3,925,074 | 12/1975 | Wyhof | 96/1.8 |
| 3,935,166 | 1/1976 | Kanai et al. | 260/47 C |
| 4,439,507 | 3/1984 | Pan et al. | 430/59 |
| 4,865,934 | 9/1989 | Ueda et al. | 430/59 |
| 4,973,530 | 11/1990 | Horie et al. | 430/59 |

FOREIGN PATENT DOCUMENTS

| 104088 | 3/1984 | European Pat. Off. |
| 408380 | 1/1991 | European Pat. Off. |
| 58-9148 | 1/1983 | Japan |
| 58-91456 | 5/1983 | Japan |
| 1-273046 | 10/1989 | Japan | 430/96 |
| 2-89062 | 3/1990 | Japan |
| 2-113257 | 4/1990 | Japan | 430/96 |
| 1440964 | 6/1976 | United Kingdom |

OTHER PUBLICATIONS

Fachinformationszentrum Chemie, GmbH, Berlin, "Parat Index of Polymer Trade Names", 1989, VCH Verlagsgesellschaft, Weinheim, Germany.

*Primary Examiner*—Marion E. McCamish
*Assistant Examiner*—Rosemary Ashton
*Attorney, Agent, or Firm*—Lowe, Price, LeBlanc & Becker

[57] ABSTRACT

Photosensitive materials which comprise, on a conductive support, a layer structure having at least one layer. The at least one film is made of a cured film of a dispersion of a photoconductor in a binder polymer which has recurring units of the following general formula

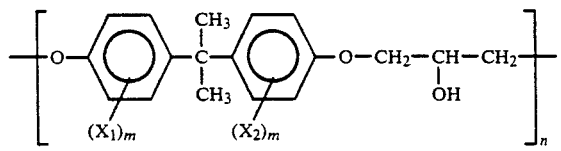

wherein each m is individually from 0 to 4, but at least one m is not 0, $X_1$ and $X_2$ are bromine atoms and n is an integer. The photoconductor may be X-type metal-free phthalocyanine or τ-type metal-free phthalocyanine dispersed partially in a molecular state and partially in a particulate state. Alternatively, combinations of carrier generation and carrier transport agents may be used. The layer structure is either a single-layer structure or a double-layer structure.

23 Claims, No Drawings

PHOTOSENSITIVE MATERIAL FOR ELECTROPHOTOGRAPHY COMPRISING ORGANIC PHOTOCONDUCTIVE SUBSTANCES IN A BINDER POLYMER HAVING AROMATIC RINGS, OH GROUPS AND BROMINE JOINED AT THE AROMATIC RING OR RINGS

This application is a continuation application of application Ser. No. 07/705,981, filed May 28, 1991, now abandoned.

BACKGROUND OF THE INVENTION

1. Field of the Invention

This invention relates to photosensitive materials for electrophotography which make use of organic photoconductive compounds or substances dispersed in a specific type of binder polymer and which are particularly suitable for use in electrophotographic systems using a charging/exposing/developing process.

2. Description of the Prior Art

As is known in the art, photosensitive compounds or substances which have been used in the field of electrophotography are broadly classified into inorganic photoconductors and organic photoconductors. Typical examples of the inorganic photoconductor include selenium, zinc oxide, titanium oxide, cadmium sulfide and the like. Typical examples of the organic photoconductors include phthalocyanine pigments, diazo pigments and the like.

The photosensitive material using the inorganic photoconductor is not always satisfactory with respect to the thermal stability and the durability. With inorganic photoconductors which are, in most case, toxic, there are problems on their preparation and handling.

On the other hand, the photosensitive material using the organic photoconductor is free of any toxic problem with excellent productivity and good economy. In addition, organic photoconductors can be arbitrarily controlled in photosensitive characteristic by modification or proper designing of the molecule. Accordingly, developments of organic photoconductors have been extensively made and a number of organic photoconductors have been in use. In fact, organic photoconductors are now being predominantly employed in the field of electrophotography.

Known organic photosensitive materials have usually a double-layer structure which includes a carrier generation layer capable of absorbing light to generate carriers and a carrier transport layer wherein the generated carriers are transported. Many attempts have been made for higher sensitivity. For attaining high sensitivity in the double-layer structure, the usual practice is that the carrier generation layer is formed in a thickness of several micrometers and the carrier transport layer is formed in a thickness of several tens micrometers. In order to impart high strength and good printing resistance, it is general that the carrier generation layer is formed directly on a substrate and the carrier transport layer is formed as a surface layer. The carrier generating agent used is one which works through movement of positive holes and the resulting photosensitive material is eventually of the negative charge type.

The negative charge systems, however, have several drawbacks: (1) negative charges attack oxygen in air to produce ozone which is not only harmful to human body, but also shortens the life of the photosensitive material by reaction therewith; (2) charging does not proceed satisfactorily; (3) the system is apt to be influenced by surface properties of a substrate such as a drum.

In order to overcome the above drawbacks, organic photosensitive materials of the positive charge type have been extensively studied. In order to realize the positive charge system, attempts have been heretofore made including (1) reversed double-layer structures wherein the carrier generation layer and the carrier transport layer are reversed to the case of the negative charge system type; and (2) single-layer structures wherein various types of carrier generation compounds and carrier transport compounds are both dispersed in a binder resin.

However, the reversed double-layer structure involves the problems such as a lowering of the printing resistance and a poor life characteristic owing to the fact that the carrier generation layer, which has to be substantially thin, is placed on the surface of the photosensitive material. In addition, there arise problems such as of complication in the fabrication process of the double-layer structure and of layer separation. Accordingly, this type of photosensitive material has not been reduced to practice yet.

With the photosensitive materials having the single-layer structure are inferior to the double-layer structure photosensitive materials with respect to the sensitivity, a charging characteristic (i.e. a charging potential gradually drops when the material is repeatedly employed), and a residual potential. Nevertheless, the single-layer structure is advantageous in that if a carrier generation agent and a carrier transport agent are uniformly dispersed throughout the layer, the printing resistance is not lowered immediately after wear of the photosensitive material. This is considered for the reason that the wear of the photosensitive material does not directly influence the photosensitive characteristic. The single-layer structure is easier in fabrication than the double-layer structure. In short, the single-layer structure and the double-layer structure have, respectively, merits and demerits.

We proposed in U.S. patent application Ser. No. 551,538 now U.S. Pat. No. 5,087,540 (corresponding European Patent Application No. 90307677.6) photosensitive materials which comprise an X-type phthalocyanine and/or τ-type phthalocyanine dispersed in polymer binders such as polyesters, polyvinyl acetate, polyvinyl chloride, polyvinylidene chloride, polycarbonates, polyvinyl butyral, polyvinyl acetoacetal and the like. The photosensitive material proposed above is convenient for use in the positive charge systems. Further studies revealed that the photosensitive material was not necessarily satisfactory with respect to the life or durability. In fact, when the material is subjected to a repetition cycle test where it is repeatedly used over 10,000 or more printing cycles, the charge voltage, attenuation in the dark and sensitivity are gradually lowered. The reason for this is considered to result from chemical fatigue such as with light and/or ozone generated in the system.

SUMMARY OF THE INVENTION

It is accordingly an object of the invention to provide organic photosensitive materials of either a positive or negative type which can solve the problems involved in the prior art organic photosensitive materials.

It is another object of the invention to provide an improvement in organic photosensitive materials of the positive charge type with a single-layer structure or a double-layer structure wherein high sensitivity and good durability are attained.

It is a further object of the invention to provide organic photosensitive materials with a single-layer structure or a double-layer structure wherein aromatic polymers having aromatic rings, OH group and Br atoms are used as a binder whereby a charging voltage, attenuation in the dark and sensitivity are not significantly lowered as time passes.

It is a still further object of the invention to provide an organic photosensitive material having a double-layer structure which is usable as either a positive charge type or a negative charge type.

Broadly, the present invention provides a photosensitive material which comprises a conductive support and a layer structure formed on the support wherein the layer structure is made of a dispersion of an organic photoconductor in a binder polymer which has recurring units of the following general formula

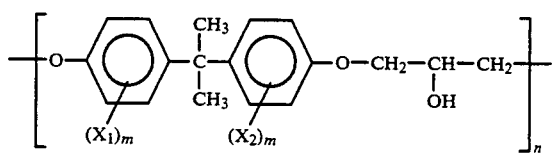

wherein each m is individually from 0 to 4, but at least one m is not 0, $X_1$ and $X_2$ are bromine atoms n is an integer of from 20 to 1000. In the formula, eight bromine atoms may be joined to the two benzene rings in a maximum and only one bromine atom may be joined to one of the benzene rings in a minimum.

The layer structure may be either a single-layer structure or a double-layer structure including a carrier generation layer and a carrier transport layer. With the double-layer structure, at least the surface layer should preferably make use of the above binder polymer in order to improve the characteristic properties of the photosensitive material. Preferably, aromatic carboxylic acids are added to the layer structure in order to further improve resistances to ozone and printing.

DETAILED DESCRIPTION AND EMBODIMENTS OF THE INVENTION

As described above, the photosensitive material of the invention has a layer structure on a conductive support.

The conductive support used in the present invention is not critical and may be made of any known materials ordinarily used for this purpose. Specific and preferable examples of the materials include metals such as aluminium, and those materials, such as glass, paper, plastics and the like, on which a conductive layer is formed such as by vacuum deposition of metals. The support may take any form such as of a drum, a belt, a sheet or the like.

The layer structure formed on the conductive support is made of a dispersion of an organic photoconductor in a binder resin or polymer. The invention is characterized by the binder resin used which has recurring units of the following formula

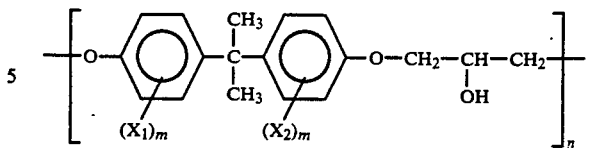

wherein each m is individually from 0 to 4, but at least one m is not 0, $X_1$ and $X_2$ are bromine atoms and n is an integer of from 20 to 1000. In view of the ease in preparation and the chemical stability, it is preferred that four bromine atoms are joined to either or both of the benzene rings in each recurring unit. More particularly, preferable polymers have recurring units of the following formulae

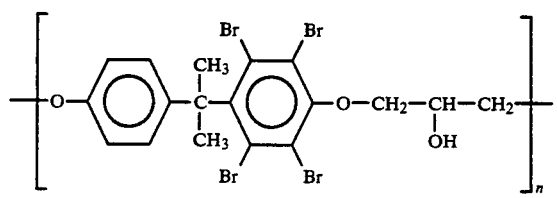

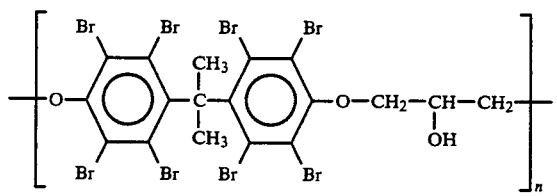

These polymers are commercially available, for example, from Fuji Pharmaceutical Co., Ltd. of Japan.

The photoconductors useful in the present invention may be any known ones. Examples of the photoconductors used in the invention include X-type and/or τ-type metal-free phthalocyanine compounds treated in a specific manner and combinations of carrier generation agents and carrier transport agents. Of these, X-type phthalocyanine and/or τ-type phthalocyanine are preferred because these phthalocyanine compounds have the capabilities of generating and transporting carriers by themselves when treated in a manner as described hereinafter. This means that when X-type phthalocyanine and/or τ-type phthalocyanine is used, any carrier transport agent is not necessary.

X-type and τ-type metal-free phthalocyanines (which may be sometimes referred to simply as $H_2$-Pc hereinafter) are described in more detail.

Phthalocyanine compounds include metal phthalocyanines having a metal atom at the center thereof and metal-free phthalocyanines. Typical known metal-free phthalocyanines include α-type and β-type phthalocyanines.

On the other hand, X-type metal-free phthalocyanine was developed by Xerox Co., Ltd. and was reported as having excellent electrophotographic characteristics. In U.S. Pat. No. 3,357,989, the X-type phthalocyanine is described with respect to its preparation, the relationship between the crystal form and electrophotographic characteristics and the structural analyses. According to this U.S. patent, X-type $H_2$-Pc (phthalocyanine) is prepared by subjecting β-type $H_2$-Pc prepared by a usual manner to treatment with sulfuric acid to obtain α-type $H_2$-Pc and then to ball milling over a long time. The crystal structure of the X-type $H_2$-Pc is apparently different from those of α- or β-type $H_2$-Pc. According to the X-ray diffraction pattern of the X-type $H_2$-Pc determined by use of a CuK α line, the diffraction lines appear at $2\theta = 7.4°$, 9.0°, 15.1°, 16.5°, 17.2°, 20.1°, 20.6°, 20.7°, 21.4°, 22.2°, 23.8°, 27.2°, 28.5° and 30.3°. The most intense diffraction peak appears in the vicinity of 7.5° (corresponding to a lattice spacing, $d_r = 11.8$ angstroms). When this intensity is taken as 1, the intensity of the diffraction line in the vicinity of 9.1° (corresponding to a lattice spacing, $d_r = 9.8$ angstroms) is 1:0.66.

$H_2$-Pc having a crystal form other than the above form is τ-type metal-free phthalocyanine. This phthalocyanine is obtained by subjecting to ball milling α, β and/or X-type crystals in an inert solvent along with a milling aid at a temperature of 5° to 10° C. for 20 hours. The X-ray diffraction pattern is similar to that of X type Pc provided that the ratio of the diffraction peak intensity at about 7.5° and the diffraction peak intensity at about 9.1° is 1:0.8.

In the practice of the invention, the layer structure formed on the substrate may be either a single layer or a double layer.

When the X-type and/or τ-type phthalocyanine is employed in the single layer, the phthalocyanine and the binder resin defined before may be dispersed in a solvent system along with a resin binder without use of any charge transport agent. Preferably, the phthalocyanine and the binder resin are mixed in a solvent system therefor until the phthalocyanine is dispersed partly in a molecular state and partly in a particulate or crystal state. By this, the X-type and/or τ-type phthalocyanine has both capabilities of carrier generation and carrier transport. Needless to say, the starting phthalocyanine compound is solid in nature at normal temperatures. More particularly, when X-type metal-free phthalocyanine and/or τ-type metal-free phthalocyanine is mixed in a solvent therefor along with a binder resin in such a way as set forth above and applied onto a conductive support, the resultant photoconductive layer exhibits both carrier transportability and carrier generating ability although the phthalocyanine is usually known as a carrier generating agent.

In a physical aspect, the exhibition of the photoconductivity is based on the X-type or τ-type phthalocyanine which is partly dispersed in a molecular state and partly dispersed in a particulate state in the resin binder. It will be noted that the term "dispersed in a molecular state" is intended to mean the state that the X-type and/or τ-type metal-free phthalocyanine compound is at least partially dissolved in a solvent to a satisfactory extent along with a binder resin and is dispersed in the matrix of the binder resin in a molecular or dimer state after removal of the solvent and the term "dispersed in a particulate state" is intended to mean that the original crystal form of the compound remains after dispersion in the resin binder.

As stated above, part of the phthalocyanine compound should be dispersed in a resin binder in a molecular state. The phthalocyanine is not readily soluble in any solvent but are at least partially soluble in a number of solvents.

In order to realize the molecular state dispersion, the phthalocyanine compound is placed in a solvent capable of at least partially dissolving the compound therein and kneaded or mixed by means of an ordinary milling or kneading device over a long term, for example, of from several hours to several days. When the kneading operation is continued, the X-type or τ-type phthalocyanine is finely divided and is partially dissolved. The partial dissolution is considered to be true in view of an abrupt increase of the viscosity of the mixture. It is also considered that the metal-free phthalocyanine which is in a molecular form is produced in the mixture. The molecularly dispersed metal-free phthalocyanine is assumed to have the carrier transport function.

The X-ray diffraction pattern of X-type $H_2$-phthalocyanine after sufficient kneading or mixing along with the binder resin according to the invention apparently differs from that of X-type metal-free phthalocyanine and also differs from the X-ray diffraction patterns of α and β-type metal-free phthalocyanines. When the X-type $H_2$-phthalocyanine is sufficiently kneaded, the diffraction pattern has the tendency that the diffraction line over $2\theta = 21.4°$ disappears with a tendency toward an increase at about 16.5° as compared with the diffraction pattern of X-type $H_2$-phthalocyanine not kneaded. The most pronounced variation is that among two diffraction peaks at about 7.5° ($d = 11.8$ angstroms) and about 9.1° ($d = 11.8$ angstroms) which are inherent to $H_2$-Pc, only the peak at about 7.5° selectively disappears. This is considered as follows: the phthalocyanine crystals are converted into an amorphous state but with some possibility that an unknown crystal form may be formed from part of X-type H2-Pc.

The degree of mixing or kneading, and the mixing time and temperature depend on the type of solvent. An appropriate degree of the mixing or kneading operation can be checked by the ratio between diffraction peak intensities at about 7.5° and about 9.1° ($I_{11.8}/I_{9.8}$). This ratio is preferably in the range of 1:1 to 0.1:1 for both X-type and τ-type phthalocyanines.

The X-type phthalocyanine and/or τ-type phthalocyanine are dispersed or dissolved in a solvent along with the binder resin defined before and mixed or kneaded in a ball mill, an attritor, a sand mill, a sand grinder or the like.

Examples of the solvent suitable for this purpose include nitrobenzene, chlorobenzene, dichlorobenzene, dichloromethane, trichloroethylene, chloronaphthalene, methylnaphthalene, benzene, toluene, xylene, tetrahydrofuran, cyclohexanone, 1,4-dioxane, N-methylpyrrolidone, carbon tetrachloride, bromobutane, ethylene glycol, sulforane, ethylene glycol monobutyl ether, acetoxyethoxyethane, pyridine and the like. Of these, tetrahydrofuran, chlorobenzene and methylnaphthalene are preferred. The above solvents may be used singly or in combination.

The X-type and/or τ-type metal-free phthalocyanine is used at a ratio, to the binder resin, by weight of 1:1 to 1:10. If the phthalocyanine is used in amounts over the ratio of 1:1, the charging characteristic will be degraded, making it difficult to charge the resultant layer at a potential of not less than 500 volts, although the photosensitive characteristic is increased. On the contrary, when the binder is used in larger amounts than the ratio of 1:10, it will become difficult to impart a satisfactory photosensitive characteristic.

The dispersion or solution obtained above is coated onto a support or substrate such as a drum or a belt by means of bar coaters, calender coaters, spin coaters, blade coaters, dip coaters or gravure coaters in a dry thickness of 5 to 30 micrometers. The binder resin defined before is thermally curable. The coating layer is thermally cured at a temperature of from 100° to 200° C.

for 30 to 120 minutes to obtain a thermally cured film formed on the support. Since the binder resin is thermally cured, the film obtained is hard, dense and resistant to heat, thus leading to good printing resistance and good stability against ozone or unlikelihood for chemical fatigue. In addition, the binder resin used in the present invention is compatible with various types of photoconductors and solvents. Accordingly, if the binder resin is used in large amounts, a uniform film with good quality is obtained.

X-type and/or τ-type metal-free phthalocyanine has been hereinabove described for application as a single layer structure wherein the phthalocyanine is treated in a specific way that it is partially dissolved in a molecular state and partially dispersed in a particulate state. The organic photosensitive material using the singe-layer structure comprising the X-type and/or τ-type metal-free phthalocyanine have the following advantages.

1. Since carrier transport agents which is relatively poor in heat resistance are not contained, the heat resistance is significantly better.

2. The sensitivity is very high and may arrives at 2 lux.second.

3. When X or τ-type metal-free phthalocyanine is used, good sensitivity to light with a wide wavelength range of from 550 to 800 nm is ensured.

Although the embodiment using X-type and/or τ-type metal-free phthalocyanine is preferred when the singe-layer structure is used, other carrier generating agents may be used in combination with carrier transport agents by dispersion in a solvent of the type set out above along with the binder resin. For this purpose, there are used metal-free phthalocyanine compounds such as α, β, X and τ-type metal-free phthalocyanines, metal phthalocyanine compounds such as copper phthalocyanine, lead phthalocyanine, tin phthalocyanine, silicon phthalocyanine, vanadium phthalocyanine, chloroaluminium phthalocyanine, titanyl phthalocyanine, chloroindium phthalocyanine, chlorogallium phthalocyanine, and the like, and perylene compounds, thiapyrilium compounds, anthanthrone compounds, squalilium compounds, bisazo compounds, cyanine compounds, trisazo compounds, azulenium compounds and mixtures thereof. These compounds are specifically described in U.S. patent application Ser. No. 551,538, which is incorporated herein by reference. Specific examples of the compounds other than the metal and metal-free phthalocyanines include those of the following formulae.

1. Perylene compound of the following formula

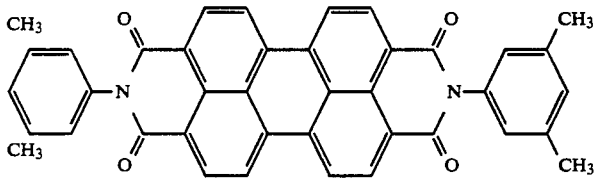

2. Perylene compound of the following formula

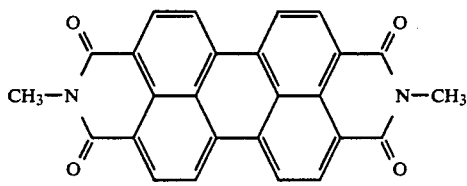

3. Compound of the following formula

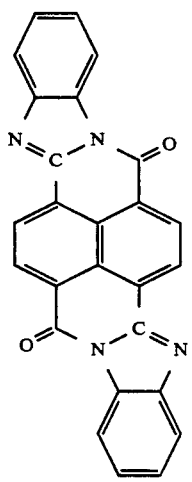

4. Anthanthrone compound of the following formula

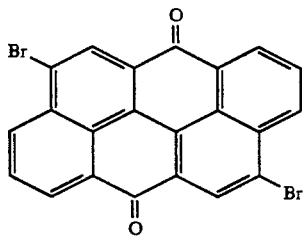
5. Thiapyrilium compound of the following formula
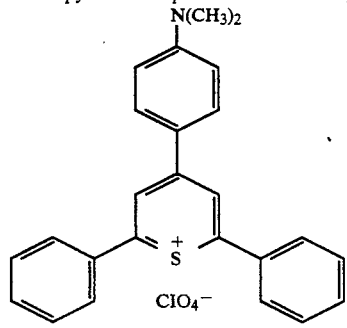
6. Compound or the following formula
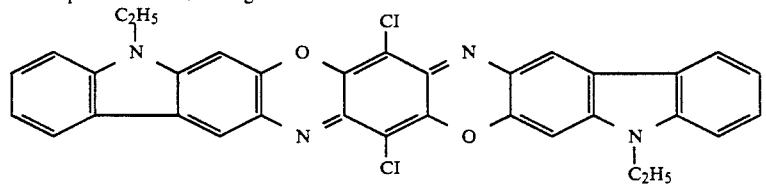
7. Squalilium compound of the following formula
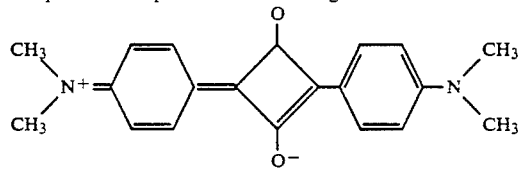
8. Cyanine compound of the following formula
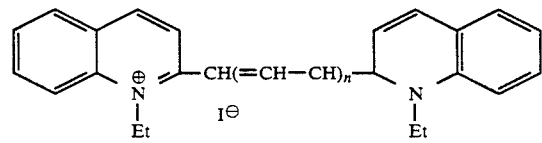
9. Squalilium compound of the following formula
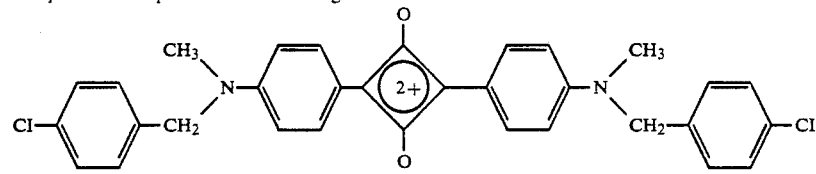
10. Azulenium dye of the following formula
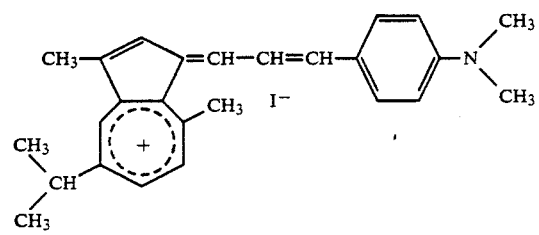
11. Trisazo compound of the following formula

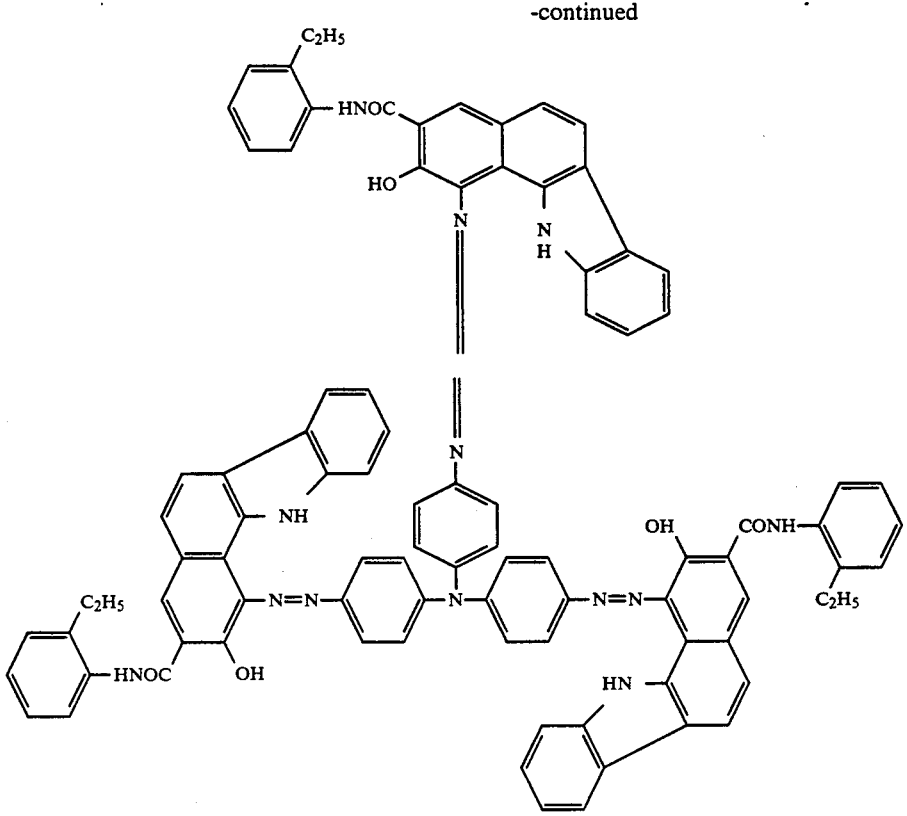

12. Diazo compound of the following formula

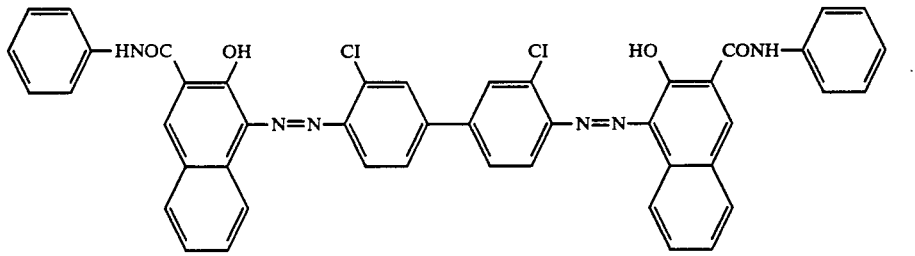

These carrier generation agents are preferably used in combination with carrier transport agents at a mixing ratio by weight of 1:1 to 1:0.01. Examples of the carrier transport agents may be any ones which are ordinarily used in the art and include, for example, hyrazone compounds, oxazole compounds, triphenylmethane compounds, arylamine compounds and the like. These may be used singly or in combination.

The organic photosensitive material using combinations of both agents in the single-layer structure has the following advantages.

(1) Such a material is suitable for use in a positive charge system.
(2) The material is more stable and better in charging characteristic than known single-layer structures.
(3) The durability and printing resistance are improved.

In order to further improve the thermally cured layer with respect to the durability, the life and the heat resistance, aromatic carboxylic acids are preferably added to the composition comprising a photoconductor and the binder resin dispersed or dissolved in a solvent. Such aromatic carboxylic acids should having at least one aromatic ring selected from a benzene ring, a naphthalene ring, an anthracene ring and a phenanthrene ring.

Specific examples of the acid include 2-naphthoic acid, anthracene-2-carboxylic acid, 1 or 2-naphthylacetic acid, 1 or 2-napthoxyacetic acid, benzoic acid, benzylacetic acid, bibenzoic acid, 2-biphenylcarboxylic acid, o-benzoylbenzoic acid, 4-benzoylbutyric acid and the like. These acids may be used singly or in combination.

The aromatic carboxylic acid is used in an amount of from 2 to 30 wt % based on the binder resin used. If the amount exceeds 30 wt %, the sensitivity is degraded.

The single-layer structure has been described as the photoconductive layer. The organic photosensitive material of the invention may further comprise a surface protective layer made of an insulating resin and formed on the thermally cured layer. Alternatively, a blocking layer may be provided between the support and the single-layer structure.

The double-layer structure formed on the support is then described.

This structure includes a carrier generation layer and a carrier transport layer. The carrier generation layer is formed by the use of a composition which comprises such binder resin and carrier generating agent defined with respect to the single-layer structure. Alternatively, the carrier transport layer may be formed by the use of the binder resin of the define formula irrespective of whether the carrier transport layer is formed on or below the carrier generation layer. If either of the layers is formed by the use of the binder resin of the aforedefined formula, the other layer may make use of other binder resins including polyesters, polycarbonates, polymethacrylates, polystyrene, polyethers, various vinyl resins, various copolymers of the monomers used to prepare the above-indicated polymers, blends thereof and the like. Preferably, the binder resin of the foregoing formula is used in both layers. The binder resin defined by the foregoing formula has very good miscibility with various carrier generating agents. Accordingly, if carrier generating agents are used in large amounts, a uniform film with good quality is formed.

Among various carrier generating agents, X-type and/or τ-type phthalocyanine is preferably used in the double-layer structure. More preferably, the phthalocyanine is mixed or kneaded in a solvent along with a binder resin to an extent sufficient to provide a two-phase dispersion where the phthalocyanine is partially dissolved in a molecular state and partially dispersed in a particulate state as set forth before. This is irrespective of the order of superposition of the two layers.

The carrier generation layer in the double-layer structure should preferably contain a carrier generating agent and a binder resin at a ratio by weight of 1:10 to 1:1.

Like the carrier generation layer, the carrier transport agent is generally used at a ratio, to the binder resin, by weight of 1:10 to 8:10.

It should be noted that if the carrier transport layer is formed on the carrier generation layer, the resultant double-layer structure is of the negatively charged type. This type of double-layer structure is, of course, within the scope of the invention. The drawbacks involved in known negative charge type photosensitive materials can be appropriately overcome by the use of the binder polymer defined in the present invention. In this case, the carrier generation layer is preferably formed using a polymer which is soluble in water or an alcohol and which is sparingly soluble in a solvent used for formation of the carrier transport layer although the binder polymer of the formula defined hereinbefore is also preferably used.

In the double-layer structure, an upper layer should preferably make use of the binder resin of the foregoing formula. The binder for the lower layer may be other resins defined above and should preferably the binder resin of the foregoing formula.

The layer or layers using the binder resin which has recurring units each of which contain two aromatic rings, an OH group and at least one bromine atom joined to the aromatic ring may further comprise an aromatic carboxylic acid. The type and amount of aromatic carboxylic acid are those defined with respect to the single-layer structure.

The carrier generation layer and the carrier transport layer should preferably have thicknesses of from 0.1 to 5 micrometers and from 10 to 50 micrometers, respectively.

The respective layers may be formed similar to the case of the single-layer structure provided that the layer or layers containing the binder resin defined before are thermally cured at a temperature of 100° to 200° C. for 30 to 120 minutes.

The photosensitive material of the invention which has either a single-layer structure or a double-layer structure exhibit good sensitivity to light with a wide wavelength range of from 550 to 800 nm. Moreover, the photosensitive materials are applicable to various types of printing systems including duplicating machines, printers, facsimiles and the like.

The present invention is described in more detail by way of examples.

EXAMPLE 1

X-type metal free-phthalocyanine (Fastogen Blue 8120B, made by Dainippon Inks Co., Ltd.) and a binder polymer of the following formula (FOC-10, available from Fuji Pharmaceutical Co., Ltd.) were dissolved in tetrahydrofuran at a ratio by weight of 1:4, and mixed by ball milling.

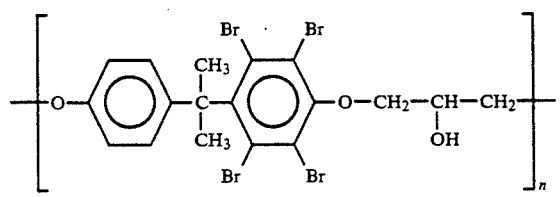

The resultant solution was applied onto an aluminium sheet by dipping and thermally treated in air at 150° C. for 1 hour to obtain a photosensitive material having a 15 to 20 μm thick, photoconductive single-layer structure.

The thus obtained photosensitive material was subjected to measurement of a photosensitive characteristic and a charge potential immediately after the fabrication and after repetition of 10,000 exposure cycles. For the measurement, Paper Analyzer Model EPA-8100, made by Kawaguchi Denki K. K., in which white light from a tungsten lamp was irradiated on the positively charged material to measure a photosensitivity (half-life exposure, $E_{\frac{1}{2}}$) and also a photosensitivity after repetition of 10,000 exposure cycles. After the repetition test, the measuring atmosphere was changed in such a way that the concentration of ozone was approximately 1 ppm to measure the photosensitivity and charge potential. The results are shown in Table 1.

TABLE 1

|  | Charge Potential | Photosensitivity lux · second |
|---|---|---|
| immediately after fabrication | 850 V | 1.8 |
| after repetition test | 820 V | 1.5 |
| in ozone atmosphere | 830 V | 1.8 |

For comparison, the above procedure was repeated except that polymethacrylate and polystyrene were, respectively, used instead of the polymer used above, thereby obtaining photosensitive materials having a single-layer structure. The comparison between the material of the invention and the materials for comparison revealed that with the materials for comparison, the charge potential at the initial stage was lower by about 10% with a larger attenuation factor in the dark. Moreover, the sensitivity, charge potential and attenuation factor in the dark were more degraded in relation to the time.

EXAMPLE 2

X-type metal free-phthalocyanine (Fastogen Blue 8120B, made by Dainippon Inks Co., Ltd.) and a binder polymer of the following formula (FOC-12, available from Fuji Pharmaceutical Co., Ltd.) were dissolved in cyclohexanone at a ratio by weight of 1:5, and sufficiently mixed.

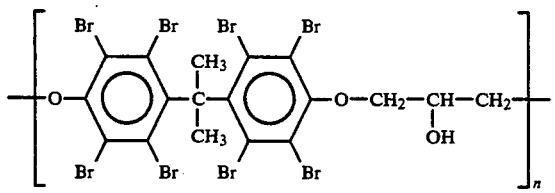

The resultant solution was applied onto an aluminium sheet by dipping and thermally treated in air at 170° C. for 1 hour to obtain a photosensitive material having a 15 to 20 μm thick, photoconductive single-layer structure.

The thus obtained photosensitive material was subjected to measurement of a photosensitive characteristic and a charge potential immediately after the fabrication and after repetition of 20,000 exposure cycles in the same manner as in Example 1. After the repetition test, the measuring atmosphere was changed such that a concentration of ozone was approximately 1 ppm to measure the photosensitivity and charge potential. The results are shown in Table 2.

TABLE 2

|  | Charge Potential | Photosensitivity lux · second |
|---|---|---|
| immediately after fabrication | 930 V | 1.2 |
| after repetition test | 910 V | 1.0 |
| in ozone atmosphere | 905 V | 1.0 |

EXAMPLE 3

The general procedure of Example 2 was repeated except that an aluminium drum was replaced by the aluminium sheet, thereby fabricating a photosensitive material. A continuous printing test was carried out using the photosensitive material. 30,000 sheets of A4-size test paper were used. As a result, it was found that after completion of the 30,000 sheet continuous test, any defect or blur of images was not observed.

From Examples 1 to 3, it will be seen that the organic photosensitive materials of the invention have high sensitivity and good resistances to ozone and printing.

EXAMPLE 4

X-type metal free-phthalocyanine (Fastogen Blue 8120B, made by Dainippon Inks Co., Ltd.) and a binder polymer of the formula indicated in Example 1 (FOC-10 with a bromination rate of 25%) were dissolved in tetrahydrofuran at a ratio by weight of 1:4, to which 5 wt % of 2-naphthoic acid, based on the binder polymer, followed by mixing by a ball milling technique. The resultant solution was applied onto an aluminium drum by dipping and thermally treated in air at 150° C. for 2 hours to obtain a photosensitive material having a 25 μm thick single-layer structure.

The thus obtained photosensitive material was subjected to measurement of photosensitive characteristics. More particularly, Paper Analyzer EPA-8100 was used to irradiate white light on a positively charged organic photosensitive material to measure a charge potential, a photosensitivity (half-life exposure, $E_{\frac{1}{2}}$) and a residual potential, Vr. Similar measurements were made after subjecting the drum to a repetition test of 10,000 cycles. The results are shown in Table 3.

TABLE 3

|  | Charge Potential | Photosensitivity lux · second | Vr |
|---|---|---|---|
| immediately after fabrication | 950 V | 2.0 | 10 V |
| after 10,000 repetition cycles | 890 V | 1.8 | 8 V |

EXAMPLE 5

X-type metal free-phthalocyanine (Fastogen Blue 8120B, made by Dainippon Inks Co., Ltd.) and a binder polymer of as used in Example 2 (FOC-12 with a bromination rate of 50%) were dissolved in cyclohexanone at a ratio by weight of 1:5, to which 3 wt % of anthracene-2-carboxylic acid was added on the basis of the polymer, followed by sufficient mixing by means of a paint shaker. The resultant solution was applied onto an aluminium drum by dipping and thermally treated in air at 120° C. for 4 hours to obtain a photosensitive material having a 20 μm thick single-layer structure.

The thus obtained photosensitive material was subjected to measurement in the same manner as in Example 4 except that the number of repetition cycles were 20,000. The results are shown in Table 4 below.

TABLE 4

|  | Charge Potential | Photosensitivity lux · second | Vr |
|---|---|---|---|
| immediately after fabrication | 750 V | 2.1 | 12 V |
| after 20,000 repetition cycles | 700 V | 1.9 | 15 V |

The organic photosensitive materials obtained in Examples 4 and 5 were also subjected to measurement (including the repetition test) in an atmosphere of ozone wherein ozone generated from an ozone generator (Clean Load 300, available from Simon Co., Ltd.) was charged into the Paper Analyzer to make an ozone atmosphere. The ozone concentration was in the range of from 5 to 10 ppm. It was found that the results were similar to those obtained in the ozone-free condition.

Moreover, similar measurements were made under conditions of temperatures ranging from 5° to 40° C. and relative humidities of from 20 to 85%. As a result, it was found that there was no significant difference.

Thus, the charge potential, photosensitivity, residual potential and ozone resistance are all excellent.

The general procedure of Example 5 was repeated, thereby forming organic photosensitive materials. The materials were mounted on a duplicator (Panasonic NP-1530) and a laser printer (Panasonic L-136) to evaluate the quality of images. In this test, the organic photosensitive materials were formed on several types of aluminium drums which were different from one another with respect to the surface roughness and the manner of washing of the drum surface. Any significant difference in the characteristics of the photosensitive materials was not found. From this, it will be seen that the photoconductors of the invention give little influence on the quality of the final product depending on the surface condition of the substrate. A good yield can be expected.

10,000 sheets of A4-size paper were printed with each of the duplicator and the laser printer, with the result that any image defect or blur was not found with a good printing resistance.

The organic photosensitive material obtained in Example 5 were subjected to a printing test wherein the thickness of the photosensitive layer was measured after repetition of 10,000 printing cycles. The thickness of 20 μm in each case was reduced to 19 μm after completion of the test. For comparison, the general procedure of Example 5 was repeated except that anthracene-2-carboxylic acid was not added. The resultant material which is also within the scope of the invention was subjected to the printing test. The layer thickness of 20 μm was reduced to 15 μm but the image quality was substantially the same as that attained in Example 4. Thus, it will be seen that the aromatic carboxylic acid is effective in further improving the printing resistance and the ozone resistance.

EXAMPLE 6

X-type metal free-phthalocyanine (Fastogen Blue 8120B, made by Dainippon Inks Co., Ltd.) and a polyester were dissolved in tetrahydrofuran at a ratio by weight of 1:4 and mixed by ball milling. The resultant solution was applied onto an aluminium sheet by dipping and thermally treated in air at 150° C. for 1 hour to form a 0.5 μm thick carrier generation layer.

A hydrazone compound used as a carrier transport agent (CTC-236, available from Anan Perfumes Co., Ltd.) and a binder polymer of the following formula (FOC-10) were dissolved in cyclohexanone at a ratio by weight of 4:10 and mixed under agitation.

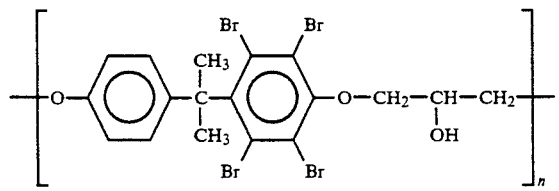

The resultant solution was applied onto the carrier generation layer and dried and thermally treated to form a 15 μm thick carrier transport layer, thereby obtaining a double-layer structure formed on the aluminium sheet.

The thus obtained photosensitive material was subjected to measurement of photosensitive characteristics. More particularly, Paper Analyzer EPA-8100 was used to irradiate white light on the negatively charged organic photosensitive material to measure a charge potential, a photosensitivity (half-life exposure, $E_{\frac{1}{2}}$) and a residual potential, Vr. Similar measurements were made after subjecting the drum to a repetition test of 10,000 cycles. The results are shown in Table 5.

TABLE 5

| | Charge Potential | Photosensitivity lux · second | Vr |
| --- | --- | --- | --- |
| immediately after fabrication | −870 V | 1.8 | −50 V |
| after 10,000 | −850 V | 1.9 | −55 V |

TABLE 5-continued

| | Charge Potential | Photosensitivity lux · second | Vr |
| --- | --- | --- | --- |
| repetition cycles | | | |

EXAMPLE 7

The carrier generation layer was formed in the same manner as in Example 6. Triphenylmethane used as a carrier transport layer and a binder resin (FOC-12) were dissolved in cyclohexanone at a ratio by weight of 3:10 and mixed under agitation. The resultant solution was applied onto the carrier generation layer and dried and thermally treated to form a 15 μm thick carrier transport layer to obtain a double-layer structure.

The resultant material was subjected to measurement of a photosensitive characteristic, a charge potential and a residual potential, Vr, immediately after the fabrication and after repetition of 20,000 cycles. The photosensitive characteristics were determined by measuring a photosensitivity (half-life exposure, $E_{\frac{1}{2}}$) by irradiating the negatively charged material with white light from a tungsten lamp by the use of Paper Analyzer EPA-8100.

The results are shown in Table 6 below.

TABLE 6

| | Charge Potential | Photosensitivity lux · second | Vr |
| --- | --- | --- | --- |
| immediately after fabrication | −970 V | 2.2 | −65 V |
| after 10,000 repetition cycles | −930 V | 2.3 | −65 V |

Further, similar measurements were made under conditions of a temperature ranging from 5° to 40° C. and a relative humidity of from 20 to 85%. Similar results were obtained.

EXAMPLE 8

The general procedure of Example 7 was repeated except that the aluminium sheet was replaced by an aluminium drum, thereby obtaining an organic photosensitive drum. This drum was subjected to a continuous printing test. When 10,000 sheets of A4-size paper were continuously printed, with no image defect being observed. The image quality was not degraded as would be caused by a lowering of the charge potential owing to the influence of ozone. Fabrication of a number of the drums resulted in good yield.

The general procedure of Examples 6 to 8 was repeated using other carrier transport agents, with similar results.

EXAMPLE 9

X-type metal free-phthalocyanine (Fastogen Blue 8120B, made by Dainippon Inks Co., Ltd.) and a binder polymer of the formula indicated in Example 1 (FOC-10 with a bromination rate of 50%) were dissolved in tetrahydrofuran at a ratio by weight of 1:4, followed by mixing by a ball milling technique. The resultant solution was applied onto an aluminium sheet by dipping and thermally treated in air at 150° C. for 1 hour to form a 1 μm thick carrier generation layer.

A hydrazone compound used as a carrier transport agent (CTC-236) and a polyester used as a binder resin were dissolved in tetrahydrofuran at a ratio by weight of 4:10 and mixed under agitation. The resultant solution was applied onto the carrier generation layer and dried to form a 5 μm thick carrier transport layer, thereby obtaining a double-layer structure formed on the aluminium sheet.

The thus obtained photosensitive material was subjected to measurement of photosensitive characteristics in a negatively charged state in the same manner as in the foregoing examples immediately after the fabrication and after a 10,000 cycle repetition test. The results are shown in Table 7.

TABLE 7

|  | Charge Potential | Photosensitivity lux · second | Vr |
|---|---|---|---|
| immediately after fabrication | −850 V | 1.2 | −20 V |
| after 10,000 repetition cycles | −830 V | 1.1 | −15 V |

EXAMPLE 10

X-type metal free-phthalocyanine (Fastogen Blue 8120B, made by Dainippon Inks Co., Ltd.) and FOC-12 with a bromination rate of 100% as a binder polymer were dissolved in cyclohexanone at a ratio by weight of 1:5, followed by mixing by a ball milling technique. The resultant solution was applied onto an aluminium sheet by dipping and thermally treated in air at 150° C. for 1 hour to form a 0.3 μm thick carrier generation layer.

Subsequently, the general procedure of Example 9 was repeated, thereby obtaining a photosensitive material.

The thus obtained photosensitive material was subjected to measurement of photosensitive characteristics in the same manner as in Example 9 immediately after the fabrication and after a 20,000 cycle repetition test. The results are shown in Table 8.

TABLE 8

|  | Charge Potential | Photosensitivity lux · second | Vr |
|---|---|---|---|
| immediately after fabrication | −950 V | 1.2 | −12 V |
| after 20,000 repetition cycles | −930 V | 1.0 | −15 V |

The measurement was also made under conditions of a temperature ranging from 5° to 40° C. and a relative humidity of from 20 to 85%. Similar results were obtained.

EXAMPLE 11

The general procedure of Example 10 was repeated using an aluminium drum instead of the aluminium sheet. The resulting photosensitive drum was used for a continuous printing test. When 10,000 sheets of A4-size paper were continuously printed, with no image defect being observed. The image quality was not degraded as would be caused by a lowering of the charge potential owing to the influence of ozone. Fabrication of a number of the drums resulted in good yield.

From the above results, it will be seen that the photosensitive materials of Examples 9 to 11 have good charge potential and sensitivity and a reduced degree of ozone degradation with a good residual potential.

EXAMPLE 12

A hydrazone compound (CTC-236) used as a carrier generation agent and FOC-10 with a bromination rate of 25% used as a binder polymer were dissolved in tetrahydrofuran at a ratio by weight of 2:3, to which 10 wt % of 2-naphthoic acid, based on the FOC-10 binder, followed by mixing by a ball milling. The resultant solution was applied onto an aluminium drum by dipping and thermally treated in air at 130° C. for 2 hours to form a 18 μm thick carrier generation layer.

X-type metal-free phthalocyanine (Fastogen Blue 8120B) and a polyester used as a binder were dissolved in tetrahydrofuran at a ratio by weight of 1:1. The resulting solution was applied onto the carrier transport layer and thermally treated to form a 3 μm thick carrier generation layer, thereby obtaining a photosensitive drum.

The drum was subjected to measurement of a photosensitive characteristic, a charge potential and a residual potential, Vr, immediately after the fabrication and after repetition of 10,000 cycles. The photosensitive characteristics were determined by irradiating the positively charged drum with white light from a tungsten lamp by the use of Paper Analyzer EPA-8100.

The results are shown in Table 9 below.

TABLE 9

|  | Charge Potential | Photosensitivity lux · second | Vr |
|---|---|---|---|
| immediately after fabrication | 850 V | 1.8 | 35 V |
| after 10,000 repetition cycles | 830 V | 2.0 | 30 V |

EXAMPLE 13

X-type metal-free phthalocyanine (Fastogen Blue 8120B) used as a carrier generation agent and FOC-12 with a bromination rate of 50% used as a binder were dissolved in tetrahydrofuran at a ratio by weight of 1:1, to which 3 wt % of anthracene-2-carboxylic acid, based on FOC-12, was further added, followed by mixing by ball milling. The resulting solution was applied onto an aluminium drum by dipping and thermally cured in air at 150° C. for 2 hours to form a 1 μm thick carrier generation layer.

Separately, a hydrazone compound (CTC-236) used as a carrier transport agent and FOC-12 used above as a binder were dissolved along with 2-naphthoic acid in tetrahydrofuran at a ratio by weight of 1:5. The resultant solution was applied onto the carrier generation layer and thermally cured to form a 20 μm thick carrier transport layer, thereby obtain a photosensitive drum.

The drum was subjected to measurement of photosensitive characteristics by a negative charging procedure immediately after the fabrication and after a 20,000 repetition cycle test in the same manner as in Example 12. The results are shown in Table 10.

TABLE 10

|  | Charge Potential | Photosensitivity lux · second | Vr |
|---|---|---|---|
| immediately after fabrication | −950 V | 2.2 | −25 V |
| after 10,000 repetition cycles | −930 V | 1.6 | −20 V |

The drum was further subjected to measurement of the photosensitive characteristics under conditions of a temperature of from 5° to 40° C. and a relative humidity of from 20 to 85%. Similar results were obtained.

Moreover, fabrication of the drum was repeated several times and the drums were subjected to similar measurement. As a result, the drums could be fabricated reliably with uniform characteristics.

In addition, photosensitive drums were fabricated in the above procedure of Example 13 so that they could be set in a duplicator (Panasonic NP-1530) and a laser printer (Panasonic L-136), followed by evaluation of images.

In the above test, several types of drums were fabricated using aluminium drum substrates having different surface roughnesses and different manners of washing. As a result, it was found that there was little difference in the photosensitive characteristics depending on the surface roughness and the manner of washing.

In addition, 10,000 sheets of A4-size paper were printed with no defects being produced in the printed matters.

EXAMPLE 14

X-type metal free-phthalocyanine (Fastogen Blue 8120B, made by Dainippon Inks Co., Ltd.) and a binder polymer of the formula indicated in Example 1 (FOC-10 with a bromination rate of 25%) were dissolved in tetrahydrofuran at a ratio by weight of 1:1, to which 5 wt % of 2-naphthoic acid, based on FOC-10, was added, followed by mixing by a ball milling technique. The resultant solution was applied onto an aluminium drum by dipping and thermally treated in air at 150° C. for 2 hours to form a 1 μm thick carrier generation layer.

A hydrazone compound used as a carrier transport agent (CTC-236) and a polyester used as a binder resin were dissolved in tetrahydrofuran at a ratio by weight of 4:10 and mixed under agitation. The resultant solution was applied onto the carrier generation layer and dried to form a 15 μm thick carrier transport layer, thereby obtaining a double-layer structure formed on the aluminium drum.

The thus obtained photosensitive material was subjected to measurement of photosensitive characteristics in a negatively charged state in the same manner as in the foregoing examples immediately after the fabrication and after a 10,000 cycle repetition test. The results are shown in Table 11.

TABLE 11

|  | Charge Potential | Photosensitivity lux · second | Vr |
|---|---|---|---|
| immediately after fabrication | −850 V | 1.2 | −20 V |
| after 10,000 repetition cycles | −830 V | 1.1 | −15 V |

EXAMPLE 15

X-type metal-free phthalocyanine (Fastogen Blue 8120B) used as a carrier generation agent and FOC-12 with a bromination rate of 50% used as a binder were dissolved in cyclohexane at a ratio by weight of 1:1, to which 3 wt % of anthracene-2-carboxylic acid, based on FOC-12, was further added, followed by mixing by ball milling. The resulting solution was applied onto an aluminium drum by dipping and thermally cured in air at 150° C. for 2 hours to form a 1 μm thick carrier generation layer.

Separately, a hydrazone compound (CTC-236) used as a carrier transport agent and FOC-12 used above as a binder were dissolved along with 2-naphthoic acid in cyclohexanone. The resultant solution was applied onto the carrier generation layer and thermally cured to form a 15 μm thick carrier transport layer, thereby obtain a photosensitive drum.

The drum was subjected to measurement of photosensitive characteristics by a negative charging procedure immediately after the fabrication and after a 20,000 repetition cycle test in the same manner as in Example 14. The results are shown in Table 12.

TABLE 12

|  | Charge Potential | Photosensitivity lux · second | Vr |
|---|---|---|---|
| immediately after fabrication | −950 V | 1.2 | −12 V |
| after 10,000 repetition cycles | −930 V | 1.0 | −15 V |

The drum was further subjected to measurement of the photosensitive characteristics under conditions of a temperature of from 5° to 40° C. and a relative humidity of from 20 to 85%. Similar results were obtained.

Moreover, fabrication of the drum was repeated several times and the drums were subjected to similar measurement. As a result, the drums could be fabricated reliably with uniform characteristics. From this, it will be found that the results of the repetition test by the negative charging procedure wherein ozone is inevitably generated are so good that the ozone resistance is significantly improved.

In addition, photosensitive drums were fabricated in the above procedure of Example 13 so that they could be set in a duplicator (Panasonic NP-1530) and a laser printer (Panasonic L-136), followed by evaluation of images.

In the above test, several types of drums were fabricated using aluminium drum substrates having different surface roughnesses and different manners of washing. As a result, it was found that there was little difference in the photosensitive characteristics depending on the surface roughness and the manner of washing.

In addition, 10,000 sheets of A4-size paper were printed with no defects being produced in the printed matters.

When the general procedure of Example 14 was repeated except that 2-naphthoic acid was not added, the carrier generation layer was partially dissolved with tetrahydrofuran used for the formation of the carrier transport layer. As a result, a photosensitive material of good quality could not be obtained. To avoid this, the type of solvent for the carrier transport layer or the type of binder in the carrier generation layer has to be properly selected.

What is claimed is:

1. A photosensitive material for electrophotography which comprises a conductive support and a layer structure formed on the support, said layer structure being made of a dispersion of an organic photoconductor in a mixture of a thermally curable binder polymer which has recurring units of the following general formula

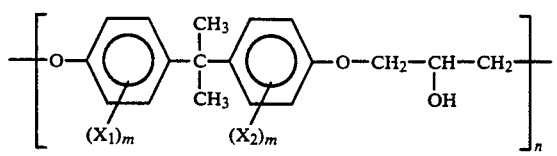

wherein each m is individually from 0 to 4, but at least one m is not 0, $X_1$ and $X_2$ are bromine atoms and n is an integer of from 20 to 1000, and from 2 to 30 weight percent, based on the binder polymer, of an aromatic carboxylic acid having at least one ring selected from the group consisting of a benzene ring, a naphthalene ring, an anthracene ring and a phenanthrene ring.

2. The photosensitive material according to claim 1, wherein said layer structure is cured.

3. The photosensitive material according to claim 1, wherein said binder polymer has recurring units of the following formula

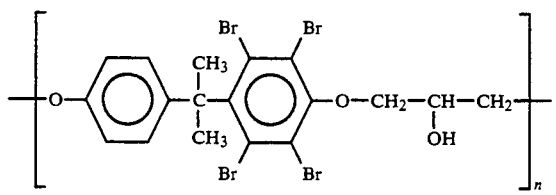

wherein n has the same meaning as defined in claim 1.

4. The photosensitive material according to claim 1, wherein said binder polymer has recurring units of the following formula

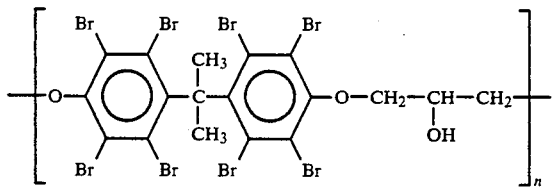

wherein n has the same meaning as defined in claim 1.

5. The photosensitive material according to claim 1, wherein said layer structure is in the form of a single layer.

6. The photosensitive material according to claim 5, wherein said single layer consists essentially of a cured film of a dispersion of X-type metal-free phthalocyanine in said mixture.

7. The photosensitive material according to claim 6, wherein said X-type metal-free phthalocyanine is dispersed partially in a molecular state and partially in a particulate state.

8. The photosensitive material according to claim 6, wherein said X-type metal-free phthalocyanine is used at a ratio by weight, to said binder polymer, of 1:10 to 1:1.

9. The photosensitive material according to claim 5, wherein said single layer consists essentially of a cured film of a dispersion of τ-type metal-free phthalocyanine in said mixture.

10. The photosensitive material according to claim 9, wherein said τ-type metal-free phthalocyanine is dispersed partially in a molecular state and partially in a particulate state.

11. The photosensitive material according to claim 10, wherein said τ-type metal-free phthalocyanine is used at a ratio by weight, to said binder polymer, of 1:10 to 1:1.

12. The photosensitive material according to claim 5, wherein said single layer comprises a dispersion of a carrier generation agent and a carrier transport agent in said mixture.

13. The photosensitive material according to claim 1, wherein said layer structure has a double-layer structure.

14. The photosensitive material according to claim 13, wherein said double-layer structure includes a carrier generation layer and a carrier transport layer, at least one of which is made of a cured film of a mixture of a binder polymer having recurring units of the following formula

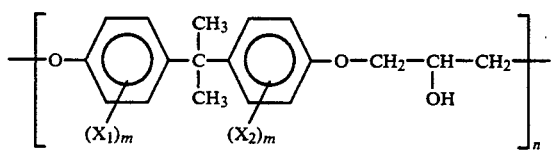

wherein each m is individually from 0 to 4, but at least one m is not 0, $X_1$ and $X_2$ are bromine atoms and n is an integer of from 20 to 1000, and from 2 to 30 weight percent, based on the binder polymer, of an aromatic carboxylic acid having at least one ring selected from the group consisting of a benzene ring, a naphthalene ring, an anthracene ring and a phenanthrene ring.

15. The photosensitive material according to claim 14, wherein said binder polymer has recurring units of the following formula

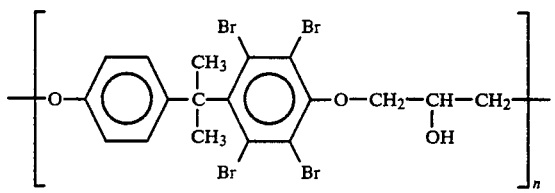

wherein n has the same meaning as defined in claim 14.

16. The photosensitive material according to claim 14, wherein said binder polymer has recurring units of the following formula

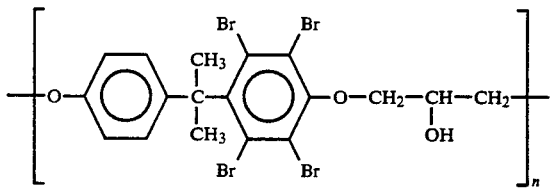

wherein n has the same meaning as defined in claim 14.

17. The photosensitive material according to claim 14, wherein both the layers contain said binder polymer of the formula defined in claim 14.

18. The photosensitive material according to claim 14, wherein said carrier generation layer is formed on said carrier transport layer and is a cured film of a dispersion of a carrier generation agent in said mixture.

19. The photosensitive material according to claim 18, wherein said carrier generation agent is a member selected from the group consisting of X-type metal-free phthalocyanine, τ-type metal-free phthalocyanine and mixtures thereof.

20. The photosensitive material according to claim 14, wherein said carrier generation layer is made of a cured film of a dispersion of a carrier generation agent in said mixture and said transport layer is made of a dispersion of a carrier transport agent in a binder resin other than said binder polymer.

21. The photosensitive material according to claim 14, wherein said carrier transport layer is formed on said carrier generation layer and is a cured film of a dispersion of a carrier transport agent in said mixture whereby said photosensitive material is of the negative charge type.

22. The photosensitive material according to claim 21, wherein said carrier transport layer is made of the cured film and said carrier generation layer is made of a dispersion of a carrier generation agent in a binder resin other than said binder polymer.

23. The photosensitive material according to claim 21, wherein said carrier generation layer is made of a cured film of a dispersion of a carrier generation agent in said mixture.

* * * * *